(No Model.)
J. F. GENT.
MACHINE FOR MAKING SHEETS OF GROUND CEREALS.
No. 347,790. Patented Aug. 24, 1886.
Fig. 1.
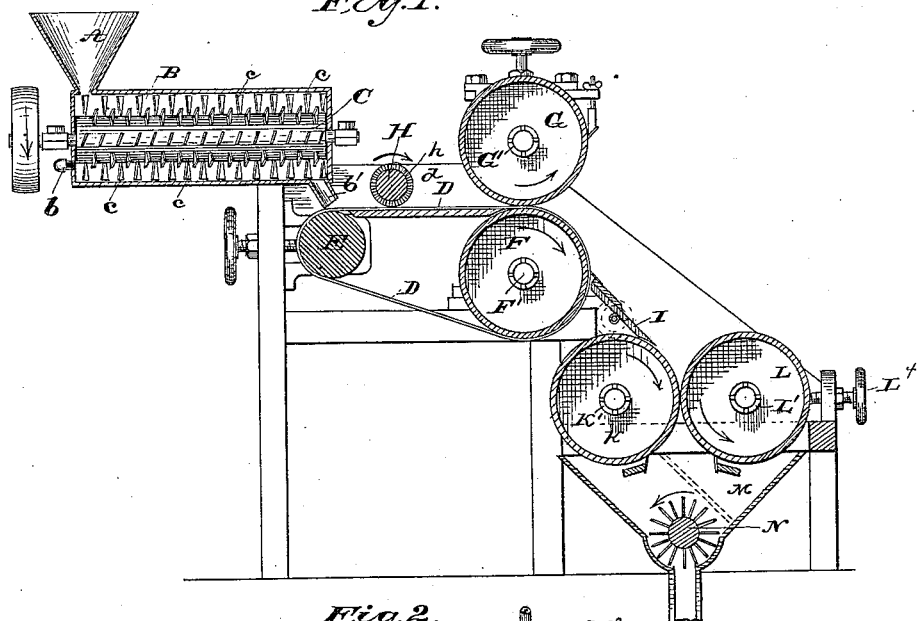
Fig. 2.
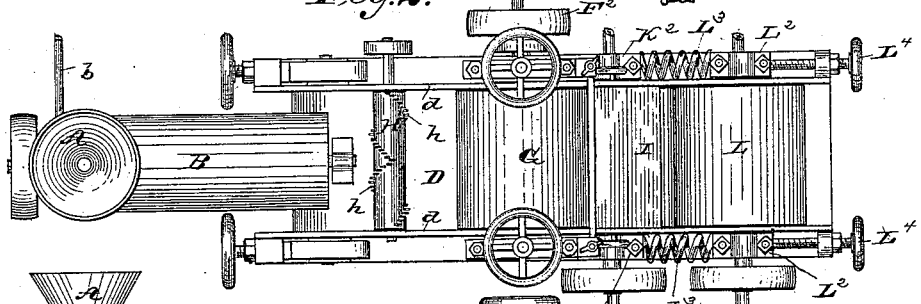
Fig. 3.
Witnesses:
E. J. Walker
Inventor:
Joseph F. Gent
by his attorney

UNITED STATES PATENT OFFICE.

JOSEPH F. GENT, OF COLUMBUS, INDIANA.

MACHINE FOR MAKING SHEETS OF GROUND CEREALS.

SPECIFICATION forming part of Letters Patent No. 347,790, dated August 24, 1886.

Application filed February 2, 1886. Serial No. 190,665. (No model.)

*To all whom it may concern:*

Be it known that I, JOSEPH F. GENT, a citizen of the United States, residing at Columbus, in the county of Bartholomew and State of Indiana, have invented certain new and useful Improvements in Machines for Making Sheets of Ground Cereals; and I do hereby declare the following to be a full, clear, and exact description of the invention, such as will enable others skilled in the art to which it appertains to make and use the same.

My invention consists of a machine for taking the ground product of a cereal and converting it into compressed glutinated sheeting, such as claimed in my application for a United States Patent filed February 2, 1886, and numbered 190,633 by the Patent Office.

A machine substantially such as I have successfully used in practice is illustrated in the annexed drawings, where—

Figure 1 represents a vertical longitudinal section of the machine. Fig. 2 represents a plan view thereof. Fig. 3 represents a side elevation of the same.

The same letters of reference indicate identical parts in all the figures.

The dry ground cereal passes from a hopper, A, into one end of a horizontal moistening-cylinder, B, into the same end of which steam is introduced through a pipe, $b$. The moistening-cylinder contains a rotating horizontal stirrer-shaft, C, armed with spirally-set blades $c$, whereby the ground cereal is stirred and gradually fed toward the other end of the cylinder. By the action of the steam and water of condensation the ground cereal is gradually converted into a moistened and slightly sticky mass, in which condition it is forced out of the discharge-spout $b'$. It is received upon an endless apron, D, (which was made of thin steel in the machine which I used,) stretched over rollers E and F. The roller E is journaled in bearings, which can be adjusted by screws, as shown, in order that the apron may be stretched to the required tautness. Roller F is a hollow metallic cylinder, provided with a hollow and perforated central shaft, F', through which steam is admitted to heat the roller and the apron. Shaft F' carries a pulley, $F^2$, for driving the roller, and thus causing the apron D to run. A hollow metallic roller, G, is journaled by its hollow perforated shaft G' in suitable bearings of the frame-work vertically above the axis of the roller F. Steam is admitted through hollow shaft G' to heat the roller G. The bearings of roller G are supported in vertical guides upon suitable springs, and are borne down by screws, as clearly shown, so that the roller G may be readily adjusted with reference to endless apron D. As the moistened and sticky material is carried toward hot roller G it meets a spreading-roller, H, armed with a line of teeth, $h$, from one end to the other, such line running in a right-handed spiral from one end of the roller to the middle, and thence in a left-handed spiral to the other end of the roller, as clearly shown in Fig. 2. This spreading-roller spreads the moistened and sticky material evenly and in a thin layer across the apron D, which then carries this layer under the hot roller G and over hot roller F, by the rolling compression and heating of which the layer is rolled and glutinated into a flabby sheet. The apron travels between suitable guard rails or boards, $d\ d$, which prevent the material from being carried over its edges. The flabby sheet is directed by a cant-board, I, to enter between a pair of hollow metallic rollers, K and L, which are heated by steam introduced through their hollow perforated shafts K' and L'. Shaft K' of roller K is journaled in fixed bearings $K^2$, but shaft L' of roller L is journaled in sliding bearings $L^2$, seated against springs $L^3$, which tend to push these bearings away from the bearings of shaft L', and thus separate the rollers K and L. By means of screws $L^4$ the bearings $L^2$ may be adjusted to set the roller L close up to roller K, in order that the flabby sheet may be hard-rolled by these rollers to reduce it to sheeting of about the thickness of ordinary thin card-board, and effect a final and firm cementation of the particles. The heat of the rollers also dries the sheeting; but I prefer to afterward kiln-dry it in a suitable kiln.

In order that the sheeting passing out of rollers K and L may be cut or broken into pieces, if desired, I arrange a hopper under these rollers containing a breaker, N, composed of a rotating shaft armed with long knives, as clearly shown in Fig. 1. A cant-board may be placed above breaker N, as shown by dotted lines in Fig. 1, to deliver the sheeting of ground cereal without subjecting it to the breaker. Suitable scrapers are arranged to scrape apron D and rollers G, K, and L, as indicated in the drawings. The stirrer-shaft C, rollers F G H K L, and breaker N are driven in the respective directions indicated by the arrows on Fig. 1 by suitable belt or other gearing. The apron D and roller G are driven to move with like relative surface speed, and the rollers K and L are also driven to move with like relative surface speed, but sufficiently faster to take the flabby sheet as fast as it comes from the apron D and roller G. The speed of the stirrer-shaft is so regulated as to supply the moistened sticky material as fast as needed. Any excess banks up behind the spreading roller.

For the sake of distinction, I term hot roller G the "glutinating-roller" and the hot rollers K and L the "reducing-rollers."

The scrapings may be returned to the hopper of the moistening-cylinder.

I prefer to moisten the ground cereal in the moistening-cylinder by means of steam; but it is obvious that water, preferably warm, may be used instead. Any excess of condensed steam or water will pass out at the discharge-spout of the cylinder. I also prefer to heat roller F, so as to heat apron D; but that is not absolutely necessary.

I claim as my invention—

1. The combination, substantially as before set forth, of the moistening-cylinder, the feeding stirrer-shaft therein, the endless traveling apron, the spreading-roller, the glutinating-roller, and the reducing-rollers.

2. The combination, substantially as before set forth, of the endless traveling metallic apron and the roller carrying the same, said roller being provided with a construction whereby it may be heated, substantially as described.

3. The combination, substantially as before set forth, of the heating reducing-rollers, the hopper below the said rollers, and the breaker in the hopper.

4. The combination, with a cylinder and a feeding stirrer-shaft therein, of the endless traveling metallic apron and a heating-roller carrying the same, and the glutinating roller, substantially as described.

5. The combination, with a glutinating-roller, of a metallic endless belt, a heating-roller carrying the same, a spreading-roller mounted above the endless apron, and a feeding construction, substantially as described.

In testimony whereof I affix my signature in presence of two witnesses.

J. F. GENT.

Witnesses:
E. T. WALKER,
B. E. J. EILS.